(12) United States Patent
Dolez

(10) Patent No.: US 6,508,442 B1
(45) Date of Patent: Jan. 21, 2003

(54) MOUNTING CLAMP FOR A TUBULAR PART

(75) Inventor: Marc Dolez, Olivet (FR)

(73) Assignee: ESPA (FR)

( * ) Notice: Subject to any disclaimer, the term of this patent is extended or adjusted under 35 U.S.C. 154(b) by 0 days.

(21) Appl. No.: 09/532,126

(22) Filed: Mar. 21, 2000

(30) Foreign Application Priority Data

Mar. 26, 1999 (FR) ............................................ 99 03812

(51) Int. Cl.[7] .................................................. F16L 3/12
(52) U.S. Cl. .................. 248/74.1; 248/74.5; 248/230.9
(58) Field of Search ............................ 248/74.1, 74.2, 248/74.5, 63, 226.12, 230.5, 230.9, 231.81

(56) References Cited

U.S. PATENT DOCUMENTS

| | | | | |
|---|---|---|---|---|
| 2,399,899 A | * | 5/1946 | Tinnerman .................... | 174/40 |
| 2,423,627 A | | 7/1947 | Tinnerman | |
| 3,061,253 A | * | 10/1962 | Keaton ......................... | 248/74 |
| 3,848,839 A | * | 11/1974 | Tillman ..................... | 248/54 X |
| 4,479,625 A | * | 10/1984 | Martz ......................... | 248/74.1 |
| 5,123,619 A | * | 6/1992 | Tomlinson et al. .......... | 248/74.1 |
| 5,220,710 A | * | 6/1993 | Laudan et al. ................. | 24/279 |
| 5,482,234 A | * | 1/1996 | Lyon .......................... | 248/74.5 |
| 5,846,017 A | * | 12/1998 | Meyer ......................... | 403/397 |
| 6,152,412 A | * | 11/2000 | Basickes et al. ............. | 248/317 |

FOREIGN PATENT DOCUMENTS

| | | |
|---|---|---|
| FR | 2513449 | 3/1983 |
| GB | 578891 | 7/1946 |

* cited by examiner

Primary Examiner—Anita King
Assistant Examiner—A. Joseph Wujciak
(74) Attorney, Agent, or Firm—Michael Best & Friedrich, LLP

(57) ABSTRACT

The invention relates to a mounting clamp for a tubular part such as a cable, a hose, a coupling, or a tube, the clamp having a loop region for surrounding the tubular part, said loop region being open and terminating in fixing tabs, each provided with at least one fixing hole, wherein at least one of said fixing holes presents at least one claw enabling a fixing element of a fixing device to be tightened in preliminary manner by being moved in translation.

8 Claims, 2 Drawing Sheets

MOUNTING CLAMP FOR A TUBULAR PART

The present invention relates to a mounting clamp for a tubular part such as a cable, a hose, a coupling, or indeed a tube.

BACKGROUND OF THE INVENTION

Mounting clamps are metal elements for holding cables, tubes, hoses, or the like.

In use, it is necessary to be able to open a mounting clamp so as to pass it around the element that is to be clamped, with this opening taking place by deforming the metal strip constituting it or by means of a "hinge", or any other form of articulation.

The difficulties encountered at present are associated with the fact that once the clamp has been mounted, it remains open and free to move in translation and rotation on the object to be clamped, which means that no or little preassembly can be performed and which gives rise to difficulties when positioning the holding screw or other clamping element.

Solutions exist at present which make use of clip systems integrated in the clamp.

The drawback of such clip systems is that they require the clamp to be clamped fully by hand during positioning, and they do not allow for any sliding of the clamp on the object to be clamped during "fine" positioning, and in addition they provide no capacity for additional tightening of the clamp.

OBJECTS AND SUMMARY OF THE INVENTION

An object of the invention is to provide a mounting clamp that enables the clamp to be prepositioned accurately at a desired location prior to fixing.

To this end, the invention provides a mounting clamp for a tubular part such as a cable, a hose, a coupling, or a tube, the clamp having a loop region for surrounding the tubular part, said loop region being open and terminating in fixing tabs, each provided with at least one fixing hole, wherein at least one of said fixing holes presents at least one claw enabling a fixing element of a fixing device to be tightened in preliminary manner by being moved in translation.

Advantageously, the clamp presents a plurality of claws distributed around said hole.

The loop region can be surrounded by a protective element, in particular an element made of elastomer.

The invention also provides a method of installing a clamp of the above-specified type and comprising:

a) installing the loop region around the tubular part;
b) inserting a fixing element of the fixing device to perform preliminary tightening;
c) positioning the clamp at a desired location on the tubular part; and
d) tightening the fixing element.

For a fixing device of the screw-and-nut type, step c) can comprise:

c1) prepositioning the clamp on the tubular part;
c2) engaging the screw in the corresponding nut; and
c3) final positioning of the clamp at the desired location.

BRIEF DESCRIPTION OF THE DRAWING

The following description given by way of non-limiting example makes it possible, with reference to the accompanying draws, to explain the present invention in greater detail.

FIG. 2b is a view from beneath of FIG. 2a.

MORE DETAILED DESCRIPTION

Figure 1:
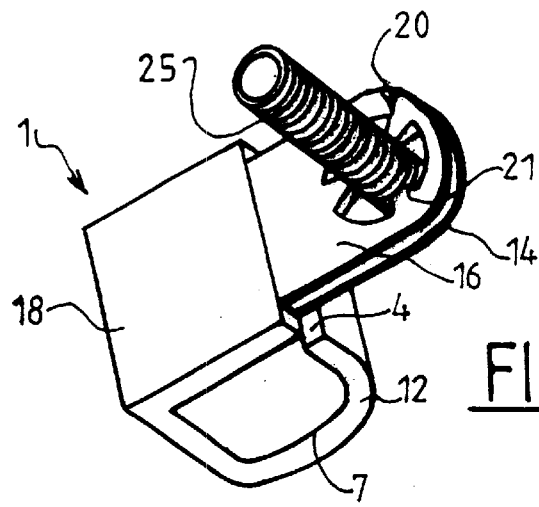
FIG. 1 is perspective view of a clamp constituting a preferred embodiment of the invention.

A mounting clamp of the invention, given overall reference 1, and intended for mounting on a tubular part 2, has a loop region 11 which forms an open loop whose edges 4 and 6 are spaced apart at 19 to enable two clamping tabs 14 and 16 to be clamped together, which tabs face each other, extending the open loop 11, and each of which has at least one hole 15, 17. The loop 11 and the tabs 14 and 16 are made from a curved and folded metal strip. The loop region 11 is advantageously coated, e.g. by overmolding, with protection 12, e.g. made of rubber, thereby conferring relative flexibility to tightening of the clamp on the part 2 and also decoupling vibration.

Figure 2A:
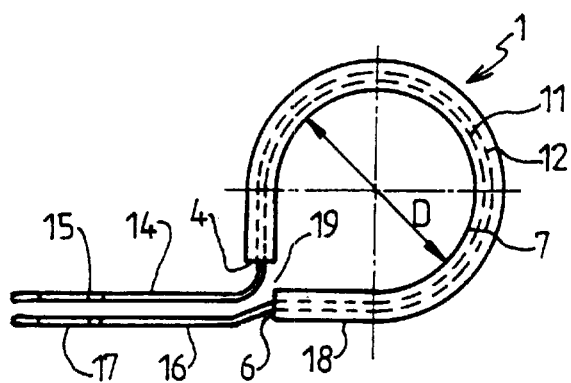
FIG. 2a is side view of a clamp constituting a variant of FIG. 1.
Figure 2B:
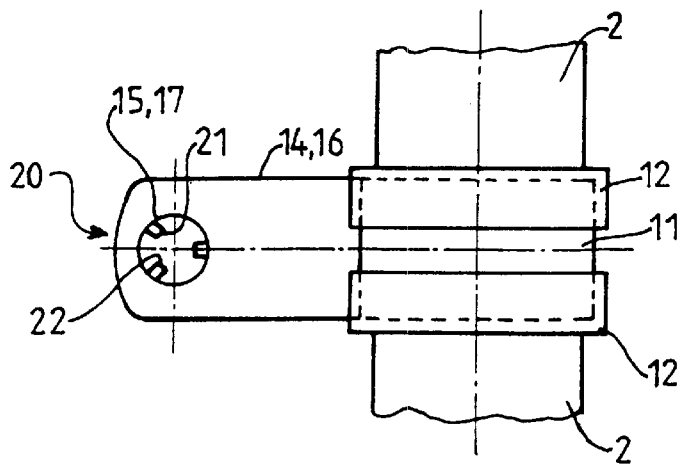

In FIG. 1, the inside face of the loop 11, and specifically the inside face 7 of the protection 12, is U-shaped, whereas in FIGS. 2a and 2b it is circular and has a diameter D. In both examples shown, the loop 11 has a plane bearing face 18 adjacent to the tabs 14 and 16 and enabling the clamp to press against a support such as part of the bodywork of a motor vehicle once the clamp has been put into position and tightening has been performed.

The hole 15 and/or the hole 17 presents one or more claws 21 which allow the thread of a screw 20 to be pushed in. The claws 21 have respective inside edges 22 leaving a through path for the screw 20 that is smaller in diameter than the outside diameter of its thread 25, and the claws are somewhat elastic, thereby enabling the thread 25 to pass through with a ratchet effect for the purpose of tightening the clamp 1 in preliminary manner and holding it in place while nevertheless allowing it to be subsequently prepositioned by being moved along the tubular element 2 up to the desired location. Thereafter, by tightening the nut 30, e.g. a nut previously engaged on the thread 25, it is possible to ensure that the clamp 1 is put finally into place.

The device of the invention, by virtue of this preliminary tightening function, thus makes it possible to position the clamp 1 finely by sliding it along the tubular element 2.

This function also makes it possible to perform preassembly prior to proceeding with clamping proper.

Figure 3:
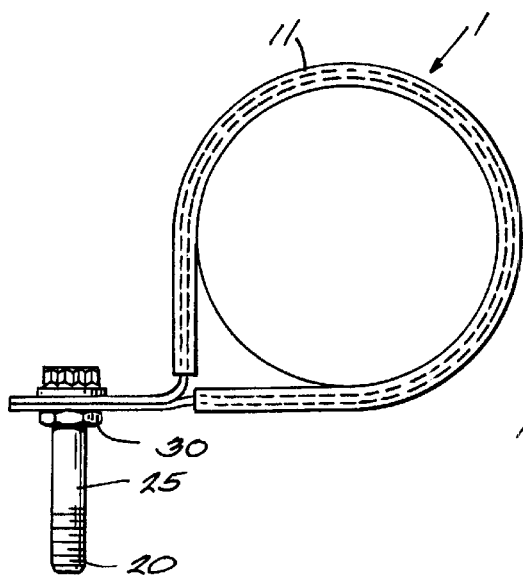
FIG. 3 view of a clamp constituting a variant of FIG. 1.
Figure 4:
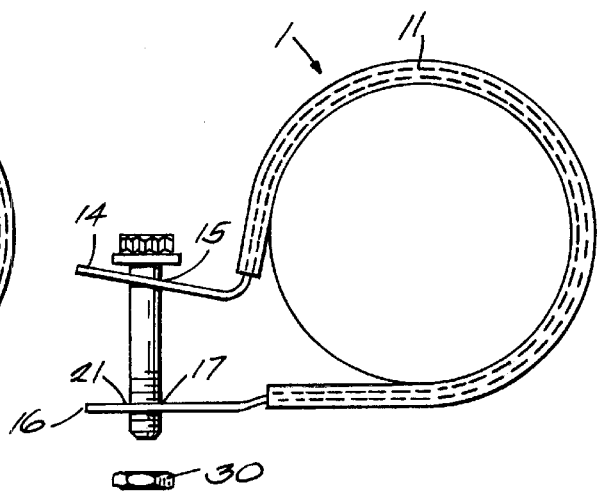
FIG. 4 is a side view of a clamp constituting a variant of FIG. 1.
Figure 5:
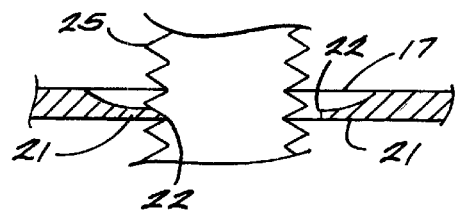
FIG. 5 an enlarged view of a portion of FIG. 4.

FIG. 3 illustrates the clamp 1 with the nut 30 engaging the screw 20, and FIG. 4 illustrates the clamp 1 with the nut disengaged from the screw 20. FIG. 5 illustrates the thread 25 passing through the claws 21.

I claim:

1. A mounting clamp for a tubular part, the clamp having a loop region for surrounding the tubular art, said loop region being open and terminating in fixing tabs, each fixing tab provided with at least one fixing hole, wherein at least one of said fixing holes presents at least one claw enabling a first fixing element of a fixing device tightened in a preliminary manner wit a ratchet effect by being moved in translation, said first fixing element cooperating with a second fixing element of said fixing device for a final clamping of the mounting clamp.

2. A clamp according to claim 1, wherein said fixing element is a screw, and wherein said second fixing element is a nut.

3. A clamp according to claim 1, presenting a plurality of claws distributed around said hole.

4. A clamp according to claim 1, including a protective element surrounding the loop region.

5. A clamp according to claim 4, wherein the protective element is made of elastomer.

6. A clamp according to claim 1, wherein the loop region has a plane bearing face adjacent to the fixing tabs.

7. A method of installing a clamp according to claim 1, the method comprising:

a) installing the loop region around the tubular part;

b) inserting and moving in translation a first fixing element of the fixing device to perform preliminary tightening with ratchet effect;

c) positioning the clamp at a desired location on the tubular part; and d) tightening said first fixing element and a second fixing element to effect final clamping.

8. A method according to claim 7, wherein the first fixing device is a screw and wherein said second fixing element is a nut, and step b) comprises:

b1) prepositioning the clamp on the tubular part;

b2) engaging and moving the screw in translation in relation at least one claw to perform said preliminary tightening;

and step c) comprises final positioning of the clamp at the desired location.

\* \* \* \* \*